United States Patent [19]
Fernwood et al.

[11] Patent Number: 5,141,719
[45] Date of Patent: Aug. 25, 1992

[54] MULTI-SAMPLE FILTRATION PLATE ASSEMBLY

[75] Inventors: George G. Fernwood, Larkspur; William A. Penaluna, Pinole; Janet Geisselsoder, Kensington, all of Calif.

[73] Assignee: Bio-Rad Laboratories, Inc., Hercules, Calif.

[21] Appl. No.: 555,139

[22] Filed: Jul. 18, 1990

[51] Int. Cl.$^5$ .................. B01L 11/00; C12M 1/12; C12M 1/20
[52] U.S. Cl. .................. 422/101; 435/301; 435/311; 210/323.1; 210/455
[58] Field of Search ........ 422/101; 435/311, 299–301; 210/955, 323.1

[56] References Cited

U.S. PATENT DOCUMENTS

| | | | |
|---|---|---|---|
| 3,378,481 | 4/1968 | Saravis et al. | 436/516 |
| 3,390,962 | 7/1968 | Goldsmith | 436/514 |
| 4,427,415 | 1/1984 | Cleveland | 422/101 |
| 4,493,815 | 1/1985 | Fernwood et al. | 422/101 |
| 4,734,192 | 3/1988 | Champion et al. | 422/101 |
| 4,902,481 | 2/1990 | Clark et al. | 422/101 |
| 4,948,564 | 8/1990 | Root et al. | 436/169 |

FOREIGN PATENT DOCUMENTS 2176601 5/1986 United Kingdom .

OTHER PUBLICATIONS

"Microfold", Isolabs, Inc., Dec. 1985.
Millititer Filtration System Product Literature, pp. 159–161.
Photographs of PALL Filtration Apparatus.
*Biotechniques*, vol. 8, No. 4, p. 439 (1990).
Pierce East-Titer ELIFA System Product Literature.

*Primary Examiner*—Jill A. Johnston
*Assistant Examiner*—Jan M. Ludlow
*Attorney, Agent, or Firm*—Townsend and Townsend

[57] ABSTRACT

A plate assembly for performing multiple filtrations with the use of a vacuum offers advantages for small samples due to the construction of its component plates, which include an upper plate with apertures forming sample wells, a membrane sheet forming the floor of each well, a collection plate with individual wells underneath the membrane sheet, aligned with the upper plate apertures, and a drop guide plate between the membrane sheet and the collection plate to guide and force small quantities of liquid downward from the membrane into the collection wells. The arrangement permits extremely small quantities of species on the membrane to be drawn into the collection wells without dilution, and avoids cross contamination between collection wells.

8 Claims, 4 Drawing Sheets

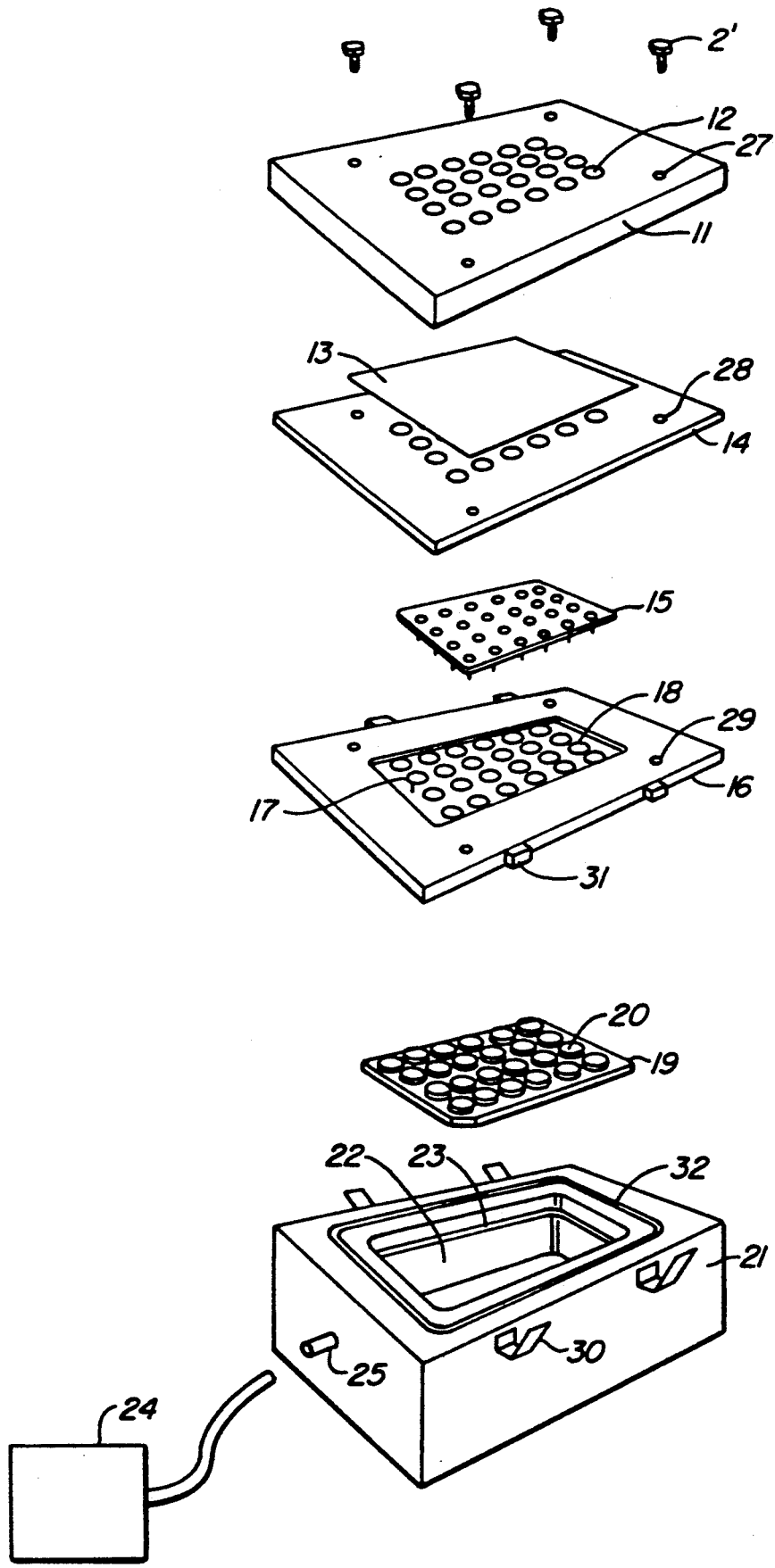
FIG._1.

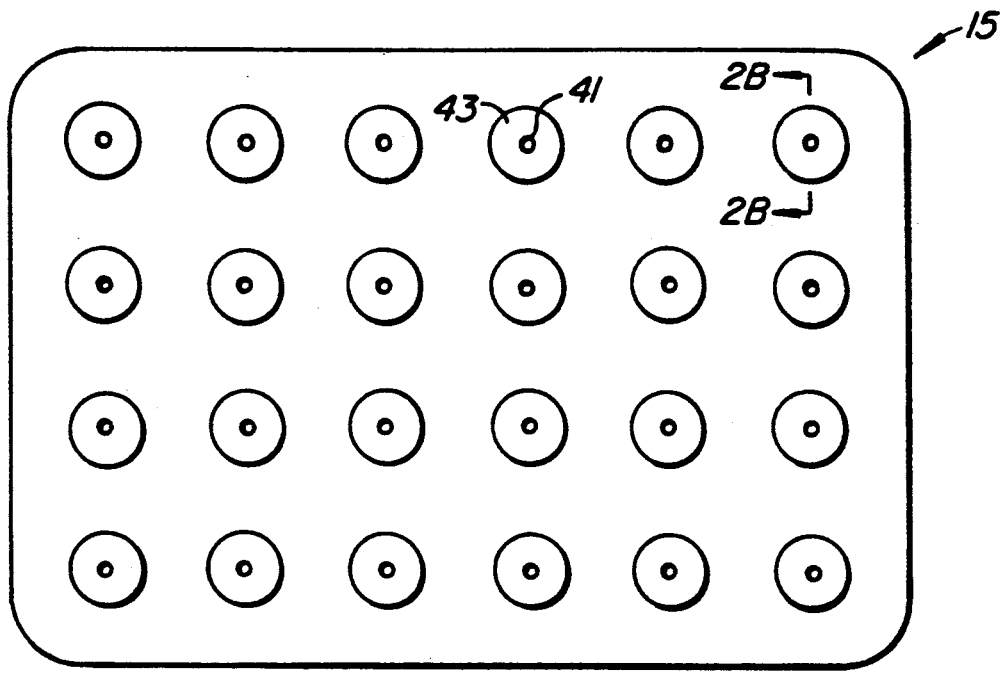
FIG._2A.
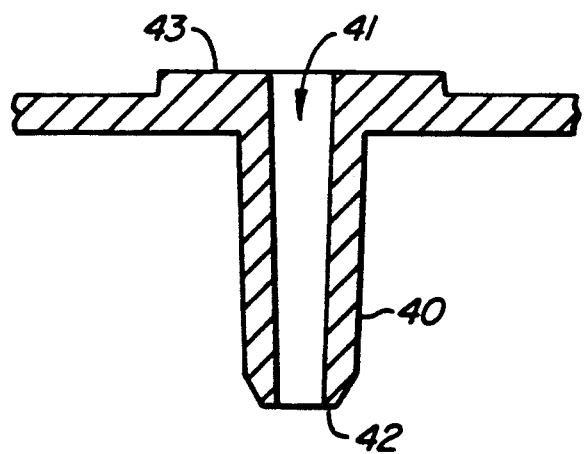
FIG._2B.

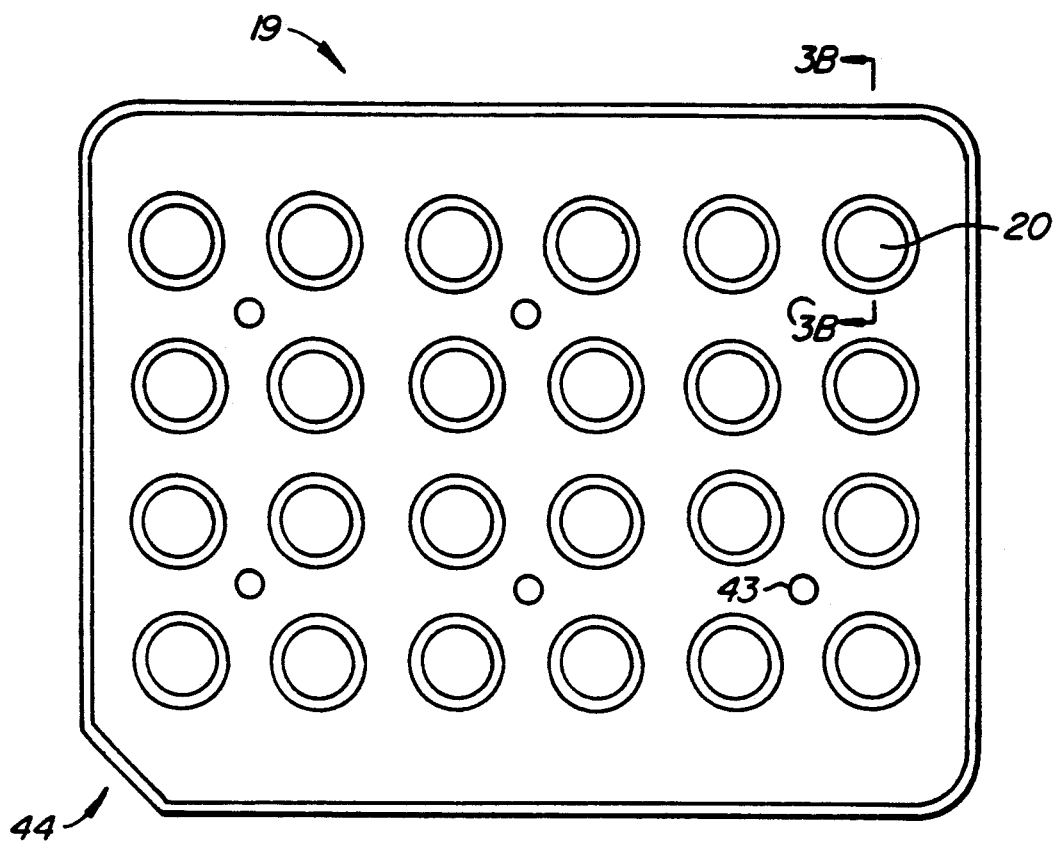
FIG._3A.
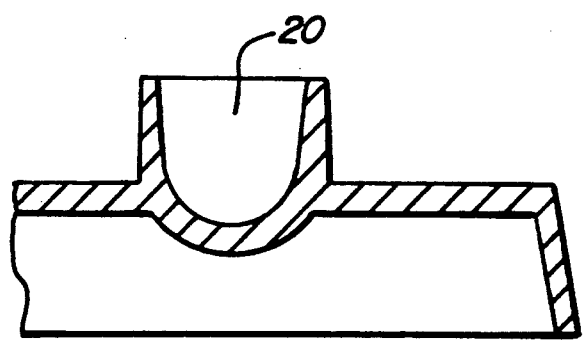
FIG._3B.

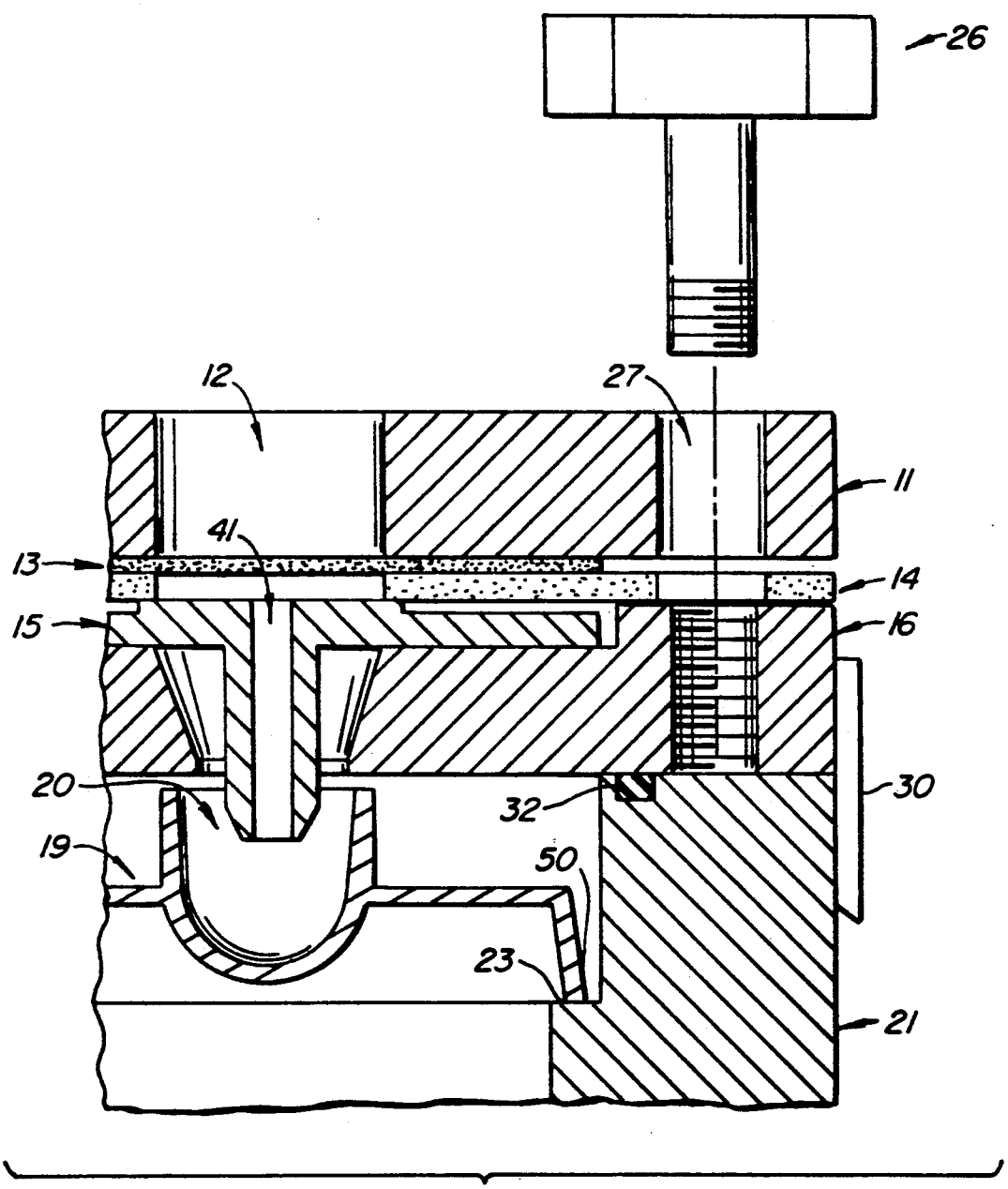
FIG._4.

MULTI-SAMPLE FILTRATION PLATE ASSEMBLY

This invention relates to membrane filtrations, and has applicability to a wide range of biochemical testing, screening and purifying procedures. In particular, this invention relates to apparatus for the simultaneous processing of multiple samples in procedures involving contact with a flow-through membrane

BACKGROUND OF THE INVENTION

Filtrations in the microliter range are used in various types of biochemical purifications. One example is the isolation of DNA from mixtures containing such additional species as RNA, proteins and various chemicals used in the treatment of the host cells, to obtain DNA templates for use in DNA sequencing In this and similar procedures, membrane filtration, and particularly vacuum filtration, offers the advantage of avoiding the need for precipitation and associated steps such as drying and resuspension. Membrane filtration usually involves a series of adsorption and desorption steps, by which one can isolate a species from a biochemical sample through various types of interactions with a solid phase. The membrane itself may be the adsorbing agent, or it may strictly be a filter used with a particulate adsorbent where adsorption is performed prior to filtration in a separate vessel, and the adsorbent and adsorbed material then applied to the membrane as a slurry.

Regardless of the function served by the membrane, filtrations like most biochemical procedures are most efficiently performed in batches, where numerous samples are processed simultaneously in a single piece of apparatus. This is particularly desirable when the samples are very small, such as 100 microliters or less, and where automated instrumentation is used for dispensing the various process fluids and/or monitoring and detecting the species sought to be isolated. Apparatus involving multi-well arrays in standard arrangements such as the 24-well arrangement found in Microtiter plates, or the 96-well arrangement found in larger systems, for example, are particularly useful.

Requirements of these multi-sample membrane filtration systems include the ability to provide sufficient membrane surface area for each sample to achieve full interaction between the liquid and solid phases, the ability to apply the vacuum evenly to all of the samples so that filtration occurs at a uniform rate, the ability to remove desired species from the membrane without excessive dilution by buffers or other carrier liquids, and the ability to collect the residue from each sample individually once the isolation has occurred.

Accommodating all of these needs in a single system is difficult. A typical problem is the difficulty of transferring desorbed isolate from the membrane to a collection well when the isolate is present in a very small quantity and dilution of the isolate must be minimized. A further problem is the difficulty of directing isolated species from each individual sample into a separate well while distributing the vacuum evenly below the membrane from a common vacuum source. Care must also be taken to prevent cross-contamination at other locations such as laterally through the membrane itself. Apparatus currently available to meet these needs suffer the disadvantages of a large number of parts, requiring time-consuming and complicated procedures for assembly, disassembly and cleaning.

SUMMARY OF THE INVENTION

A filtration plate assembly has now been developed which provides for the simultaneous filtration of a multitude of samples in a manner which avoids the problems cited above.

A central feature of the assembly is a drop guide plate which fits below the membrane which forms the floor of each of the sample wells. Narrow tubular passages incorporated in the drop guide plate are aligned with the sample wells, and the drop guide plate itself is constructed such that the tubular passages provide the only outlet for fluid passage through the bottom of each sample well. It has been discovered that with sufficiently narrow tubular passages droplets can be extracted from the membrane which are considerably smaller than the minimum size droplets obtainable under gravity or a vacuum-induced pressure differential alone. The tubular passages are also capable of directing the extracted droplets to individual collection wells in an underlying collection plate, despite the fact that there is an open passage between the tops of the wells and the drop guide plate to permit transmission of vacuum evenly among the wells.

Further features of the drop guide plate and other plates of the assembly characterize preferred embodiments of the invention. In some of these embodiments, for example, the tubular passages in the drop guide plate terminate at their upper ends in raised lands or peripheral regions surrounding the tube openings. These raised lands serve as compression surfaces for a gasket sheet underlying the membrane, and thus promote sealing around each well to prevent cross contamination. Further embodiments include a base block to support the sample wells, membrane, gasket and drop guide plate, with a reservoir and a vacuum attachment to draw a vacuum downward through the wells. The base block also holds a collection plate containing the collection wells in a removable manner inside the reservoir.

Other features, embodiments and advantages of the invention will be apparent from the description which follows.

BRIEF DESCRIPTION OF THE DRAWINGS

FIG. 1 is an exploded view in perspective of a plate assembly in accordance with the present invention.

FIGS. 2a and 2b are views of the drop guide plate included in the assembly shown in FIG. 1. FIG. 2a is a top plan view, while FIG. 2b is a side cross section taken along the line B—B of FIG. 2a.

FIGS. 3a and 3b are views of the collection plate included in the assembly shown in FIG. 1. FIG. 3a is a top plan view, while FIG. 3b is a side cross section taken along the line B—B of FIG. 3a.

FIG. 4 is a side elevation view in cross section of the assembly shown in FIG. 1.

DETAILED DESCRIPTION OF THE INVENTION AND PREFERRED EMBODIMENTS

For convenience, the invention will be described by reference to one specific embodiment, as depicted in the drawings.

The parts which constitute the entire assembly in this embodiment are shown in FIG. 1. An upper plate 11 contains an array of apertures 12 or holes passing completely through the thickness of the plate. Each of these apertures 12 forms the side wall of one sample well, and are arranged in a geometrical array selected as a matter of convenience and/or to conform with similar arrays in other pieces of equipment for handling multiple samples. The plate in this embodiment contains 24 wells in a 6×4 array. The wells are circular in this embodiment, and their vertical cross section, although not shown, may be straight, tapered or other shaped to impose various flow characteristics to liquids passing through the well.

A porous membrane sheet 13 is positioned below the wells. The sheet is sized to span the entire well array, closing off the undersides of each of the apertures 12. The membrane sheet 13 serves as the filter in the filtration process, either to retain solid particles in slurries or suspensions placed in the apertures 12 and drawn downward or to adsorb species dissolved in solutions which are likewise placed in the apertures and drawn downward. The membrane material and pore size will vary depending on the function of the membrane Examples of specific procedures are given below as illustrations.

The membrane 13 depicted in FIG. 1 is a continuous uniform sheet of porous material. One alternative is individual membrane disks securable or secured to the bottom of each aperture 12. Another is a nonporous film or sheet the same size as the membrane shown, but containing porous circular regions, one aligned with each of the apertures 12. Further alternatives will be apparent to those skilled in the art.

Positioned below the membrane sheet 13 is a gasket sheet 14, and below the gasket sheet is the drop guide plate 15. The drop guide plate in this embodiment serves two functions. The first is to provide contact surfaces to press the membrane sheet 13 against the lower rim of each of the apertures 12 while still permitting fluids to pass through, and the second is to facilitate droplet withdrawal from the membrane sheet 13 in the downward direction Below the drop guide plate 15 is a support plate 16 which serves as a clamping plate to force the drop guide plate against the components above it. The support plate has a recess 17 in its upper surface with contours complementary to those of the drop guide plate 15, to receive the drop guide plate and set its position The support plate 16 also contains apertures 18 designed to permit the tubes of the drop guide plate 15 (described in more detail below) to pass through into the collection plate 19 below.

The collection plate 19 contains an array of collection wells 20, open at the top and closed at the bottom, to collect the purified or isolated species from the membrane 13 after desorption. The collection plate 19 fits inside a base block 21, in an open reservoir 22, resting along a ledge 23 at a designated height above the reservoir floor. A vacuum source 24 is connected to the reservoir through a vacuum port 25, to draw a vacuum in the reservoir, thereby applying a pressure differential across the membrane 13 when the parts are assembled.

The upper plate 11, membrane sheet 13, gasket sheet 14, drop guide plate 15 and drop guide support plate 16 form an upper subassembly, and are sized and constructed to be held together as a unit by tightening screws 26. In this particular embodiment, the membrane sheet 13 and drop guide plate 15 are of lesser lateral dimensions than the upper plate 11, gasket sheet 14 and support plate 16. This leaves a border on each of the latter surrounding the well array, useful for clamping these elements together with the smaller elements in between. The four screws 26 pass through holes 27, 28, 29 in these elements, the lowest set of holes 29 being threaded. Conventional clamping elements of various types, number and distribution around the well array may substitute for the screws shown in the Figure.

The drop guide support plate 16 and base block 21 together form a lower subassembly, which is likewise constructed to be held together as a unit. A separate array of clamping devices hold the lower subassembly, the devices in this embodiment consisting of four latches 30 arranged around the periphery of the base block 21, each mating with a keeper 31 in corresponding positions on the periphery of the drop guide support plate 16. One example of devices of this kind are polypropylene draw latches with integral hinges. These and similar devices are readily available in the plastic industry.

To help retain the vacuum drawn in the reservoir 22 of the base block 21, a convention ring gasket 32 is interposed between the upper surface of the base block 21 and the underside of the drop guide support plate 16.

The drop guide plate 15 is shown in enlarged detail in FIGS. 2a and 2b. The drop guide plate is designed to direct the filtrates and elution fluid into the wells of the collection plate 19. This is achieved by an array of tubes 40 in the drop guide plate, one of which is shown in cross section in FIG. 2b. Each tube forms a through passage 41 of restricted diameter for the filtrate and elution fluid to pass through to the collection wells below. The length of each tube is not critical, but will be of sufficient length to direct any liquid passing through the tube to the corresponding well without loss to surrounding areas due to spraying or splattering of the liquid as it encounters a pressure drop upon leaving the tube. A typical length will range from about 0.25 inch (0.63 cm) to about 1.0 inch (2.54 cm). In one specific embodiment of the invention, the tube length is 0.375 inch below the lower surface of the drop guide plate.

The inner diameter of the tube may also vary, but will be small enough to cause a drop of a preselected minimum size to span the cross section of the tube entirely, and therefore be forced down through the tube by a pressure differential. The minimum size itself is not critical to the invention, although in most cases in which this invention will be used, it will be desirable to have a drop as small as 20–30 microliters spanning the tube passage. For a drop of this size, a tube passage with an inner diameter of one-sixteenth of an inch is particularly effective. In the broader sense of the invention, the inner diameter of the tube passage will be less than about 0.1 inch (0.254 cm), preferably from about 0.05 inch to about 0.08 inch (0.127 cm to 0.203 cm).

The lower end of each tube in the embodiment shown in the drawing is chamfered to improve the ease with which a drop at the end of the tube becomes disengaged from the tube. The chamfered end in the specific embodiment referred to above is truncated in a flat peripheral ring 42 at the end of the tube, the width of the ring being 0.010 inch (0.0254 cm).

The upper opening of each tube is surrounded by a raised land 43 (i.e., raised flat portion). All such lands are equiplanar, and their purpose is to serve as the only contact between the drop guide plate 15 and the gasket sheet 14 when the parts are clamped together, thereby focusing the clamping force around each individual well. The lands in this embodiment are circular, but may be of any shape. Their dimensions are not critical and may vary according to preference. In a particular example, the lands have an outer diameter of 0.375 inch (0.95 cm), with a tube passage opening of 0.063 inch (0.16 cm). The height of each land in this example is 0.025 inch (0.0635 cm).

The collection plate 19 is shown in enlarged detail in FIGS. 3a and 3b. The collection wells 20 are open only at the top, and are arranged in the same array as the tubes in the drop guide plate 15 of FIG. 2a. In addition to the wells 20, the collection plate 19 contains through passages 43 to permit transmission of the vacuum drawn from beneath the collection plate to the regions above the plate and inside the wells 20. One corner 44 of the collection plate is angled to prevent inexperienced or inattentive operators from incorrectly positioning the plate. A corresponding corner of the base block reservoir 22 is similarly angled.

A cross section of the assembled parts is shown in FIG. 4. Here it may be seen that the membrane sheet 13 spans the bottom opening of the apertures 12 in the upper plate 11 which form the sample wells, and that the gasket sheet 14 contains openings aligned with the sample wells for the fluids to pass through. The tube passages 41 in the drop guide plate 15 are positioned below each sample well, at the center of each well, and are each of sufficient length that the lower end of each tube extends below the upper rim of each collection well 20 directly below. The outer edges 50 of the collection plate 19 rest on the ledge 23 which extends along the internal wall of the recess in the base block.

The plates of the plate assembly may be constructed of any rigid inert material, including transparent materials as well as opaque materials. Conventional materials may be used, such as for example acrylics, polycarbonates, polypropylenes and polysulfones. The plates may be formed by any conventional means, injection molding being a particularly convenient technique. The gasket sheet may be formed of any deformable resilient inert material capable of forming a seal. Examples of such materials are silicone rubber, polyurethane elastomer and polyvinyl chloride. The thickness of the gasket is not critical, provided only that it form a seal. Typical gasket thicknesses will usually range from about 0.1 cm to about 0.5 cm. The membrane, as mentioned above, will be formed of any of a wide variety of materials, depending on whether the membrane serves strictly as a size exclusion filter or whether it also serves as a solid phase interacting with a species in the liquid phase to immobilize species upon contact, such as an immunological interaction or any other type of affinity interaction.

Of the many applications of the plate assembly of the present invention, two are described in detail in the following examples. These examples are included for illustrative purposes only, and are intended neither to define nor to limit the invention in any manner.

EXAMPLE 1

A culture supernatant resulting from a five-hour M13 phage amplification in recipient *E. coli* cells was used as the source of DNA. The phage particles were precipitated from the supernatant by addition of glacial acetic acid (10 μL in 1 mL of supernatant). The resulting mixture was applied to a membrane formed by binding diatomaceous earth to a Teflon matrix, resulting in a membrane with a pore diameter of 1–5 microns, in a test plate assembly with the configuration shown in the drawings accompanying this specification. Application was achieved by addition of the mixture through the tops of the sample wells 12. The assembly at this stage did not include the collection plate 19.

A vacuum of 13 in. mercury was then drawn from below the membrane. A solution containing 1M NaClO$_4$, 0.05M Tris-HCl (pH 8) and 10 mM Na$_2$EDTA (pH 8) was applied to the filter surface and maintained in contact for ten minutes without vacuum, to lyse the phages by irreversibly denaturing their protein coats. During this time, the exposed DNA became bound to the membrane material. After the ten minute period, the vacuum was applied once again, to draw the liquid through the membrane. The samples were washed with the same solution by adding two 250 μL aliquots per well, and filtering each separately through the membrane with the vacuum. Excess salt and protein components were then removed by a wash buffer of 20 mM Tris-HCl (pH 7.5), 2 mM EDTA, 0.4M NaCl and 50% ethanol, in three 250 μL aliquots.

The collection plate 19 was then inserted, and 60 μL of a solution containing 10 mM Tris-HCl (pH 8) and 1 mM EDTA was placed in each well of the upper plate 11. The vacuum was then applied, causing purified, single-stranded DNA to elute into the individual collection plate wells, in a form suitable for direct use.

EXAMPLE 2

A single plaque of M13 phage was placed in 2 mL early log phase *E. coli*, and incubated at 37° C. for five hours. The cell suspension was then poured into a 1.5 mL centrifuge tube, and spun for 15 minutes on a centrifuge to pellet the cells. The supernatant (1 mL) was then combined with 10 μL of glacial acetic acid in a clean centrifuge tube, and incubated at room temperature for five minutes. Diatomaceous earth (3 μL) was then added and mixed, then let stand at room temperature for another five minutes. The mixture was then centrifuged for 30 seconds, and the supernatant removed by suction.

The resulting pellet was then resuspended in 15 μL of a solution containing 1M NaClO$_4$, 0.05M Tris-HCl (pH 8) and 10 mM Na$_2$EDTA (pH 8), incubated at room temperature for ten minutes, then centrifuged for 30 seconds. The supernatant was then removed by suction, and the pellet resuspended in 250 μL of the same NaClO$_4$ solution. This was repeated one more time, after which the pellet was resuspended in 250 μL of a wash buffer consisting of 20 mM Tris-HCl (pH 7.5), 2 mM EDTA, 0.4M NaCl and 50% ethanol, followed by centrifugation for 30 seconds, and the wash repeated twice. The pellet was then resuspended in 50 μL of 10 mM Tris-HCl (pH 8) and 1 mM EDTA.

The resulting suspension was then applied to the plate assembly depicted in the drawings, using a plain Teflon membrane with a pore diameter of 1–5 microns. Once the vacuum was applied, purified, single-stranded DNA, suitable for direct use, eluted into the individual collection plate wells.

The foregoing is offered primarily for purposes of illustration. As will be readily apparent to those skilled in the art, further variations may be made in the materials, dimensions and configuration and arrangement of parts discussed herein, without departing from the spirit and scope of the invention.

What is claimed is:

1. A plate assembly for performing filtration on a plurality of samples, said assembly comprising:
   an upper plate having a plurality of apertures;

a single sheet of porous material of sufficient dimensions to span the entire plurality of said apertures;

a rigid single-piece drop guide plate with a plurality of tubes incorporated therein, said tubes extending through said drop guide plate and aligned with said apertures, each said tube having an inner diameter of less than about 0.1 inch and terminating in a raised land of diameter exceeding the diameter of each of said apertures;

a drop guide support plate having a recess to receive said drop guide plate, said recess surrounded by a peripheral shoulder, said drop guide support plate having a plurality of passages therethrough, one aligned with each of said apertures, to permit said tubes of said drop guide plate to extend therethrough;

clamping means for clamping said upper plate to said peripheral shoulder of said drop guide support plate such that said drop guide support plate will force said drop guide plate against the underside of said upper plate and thereby force said raised lands against regions on the underside of said upper plate surrounding each of said apertures;

a lower plate having a plurality of wells aligned with said apertures and said tubes;

said upper plate, drop guide plate and lower plate constructed to fit together in a manner permitting the placement of one end of each of said tubes against the underside of said porous membrane at the closed end of one of said apertures with the other end of each of said tubes extending into the interior of one of said wells; and means for drawing a vacuum through said upper plate, drop guide plate and lower plate when so joined, to draw liquid from said apertures through said tubes into said wells.

2. A plate assembly in accordance with claim 1 in which each said tube has an inner diameter of from about 0.05 inch to about 0.08 inch.

3. A plate assembly in accordance with claim 1 further comprising a base block with a chamber therein, and means for supporting said lower plate in said chamber.

4. A plate assembly in accordance with claim 1 in which said clamping means comprises:

only one gasket sheet interposed between said upper plate and said drop guide support plate, said gasket sheet having holes therein aligned with said apertures, the diameter of said holes approximately equal to that of said apertures;

and said upper plate, drop guide plate and drop guide support plate are constructed to fit together in a manner permitting said upper plate and said drop guide support plate to be clamped together with said sheet of porous material, said gasket sheet and said drop guide plate in between, thereby compressing said upper plate, said sheet of porous material, said gasket sheet and said drop guide plate together.

5. A plate assembly in accordance with claim 4 in which said upper plate, said drop guide plate and said drop guide support plate are collectively defined as a subassembly, and said plate assembly further comprises a base block with a recess in the upper surface thereof, said base block sized to support said subassembly above said recess, and means in said recess for supporting said lower plate therein.

6. A plate assembly in accordance with claim 4 in which said upper plate, said drop guide plate and said drop guide support plate are each substantially rectangular, and said upper plate and said drop guide support plate both exceed said drop guide plate in at least one dimension selected from length and width.

7. A plate assembly in accordance with claim 6 in which said plate assembly further comprises bolting means for bolting said upper plate to said drop guide support plate with said sheet of porous material and said drop guide plate in between, with bolts positioned to bypass said sheet of porous material and said drop guide plate.

8. A plate assembly for performing filtration on a plurality of samples, said assembly comprising:

an upper plate having a plurality of apertures arranged therein in an array;

a porous membrane sheet spanning said array of apertures;

only one gasket sheet, said gasket sheet having a plurality of holes therein aligned with said apertures;

a rigid single-piece drop guide plate with a plurality of tubes incorporated therein, extending therethrough and aligned with said apertures, each said tube having an inner diameter of from about 0.05 inch to about 0.08 inch, a length of from about 0.25 inch to about 1.0 inch, and terminating at an upper end in a raised land;

a drop guide support plate sized to receive said drop guide plate and having at least one opening therein to permit passage of said tubes;

means for clamping said drop guide support plate to said upper plate with said raised lands compressing said porous membrane sheet and said gasket sheet against the underside of said upper plate;

a lower plate having a plurality of wells aligned with said apertures and said tubes;

a base block having an upper surface with a recess therein, said base block constructed to support said drop guide support plate above said recess and containing means in said recess for supporting said lower plate therein and means for drawing a vacuum in said recess.

* * * * *